(12) United States Patent
Simons

(10) Patent No.: US 6,774,320 B2
(45) Date of Patent: Aug. 10, 2004

(54) STANDARD ATTACHMENT FITTINGS FOR WIRE ROPE AND CHAIN ENHANCED TO ALSO PERFORM LOAD WEIGHING FUNCTIONS

(76) Inventor: Gerald S. Simons, 6 Forest Laneway, Toronto, Ontario (CA), M2N 5X9

(*) Notice: Subject to any disclaimer, the term of this patent is extended or adjusted under 35 U.S.C. 154(b) by 129 days.

(21) Appl. No.: 09/996,725

(22) Filed: Nov. 30, 2001

(65) Prior Publication Data

US 2003/0102170 A1 Jun. 5, 2003

(51) Int. Cl.[7] ............................... G01L 1/22; G01G 1/18
(52) U.S. Cl. ................ 177/147; 177/211; 73/862.627; 73/862.635; 73/862.642; 73/862.56
(58) Field of Search ............................... 177/147, 211; 73/862.56, 862.627, 862.635, 862.642

(56) References Cited

U.S. PATENT DOCUMENTS

| | | | | |
|---|---|---|---|---|
| 2,421,222 A | * | 5/1947 | Schaevitz | 73/862.52 |
| 2,813,709 A | * | 11/1957 | Brier | 177/137 |
| 3,077,178 A | * | 2/1963 | Gordon | 116/212 |
| 3,100,290 A | * | 8/1963 | Propper | 338/5 |
| 3,290,931 A | * | 12/1966 | Fowkes et al. | 73/862.56 |
| 3,911,737 A | * | 10/1975 | Ormond | 73/862.629 |
| 4,102,295 A | * | 7/1978 | Crook, Jr. et al. | 177/147 |
| 4,282,762 A | * | 8/1981 | Zenker | 73/862.52 |
| 4,283,942 A | * | 8/1981 | Fishfader | 73/862.632 |
| 4,455,880 A | * | 6/1984 | Näslund | 73/862.56 |
| 4,660,666 A | * | 4/1987 | Reder et al. | 177/148 |
| 4,977,783 A | * | 12/1990 | Pratt | 73/862.392 |
| 5,016,026 A | * | 5/1991 | Floy | 177/147 |
| 5,429,007 A | * | 7/1995 | Khachaturian et al. | 73/862.56 |
| 5,589,646 A | * | 12/1996 | Khachaturian et al. | 73/862.56 |
| 5,591,943 A | * | 1/1997 | Cheng | 177/147 |
| 5,783,755 A | * | 7/1998 | Bruns | 73/862.541 |
| 5,831,222 A | * | 11/1998 | Fänger et al. | 177/147 |
| 5,837,946 A | * | 11/1998 | Johnson et al. | 177/136 |
| 5,847,290 A | * | 12/1998 | Kim | 73/862.641 |
| 6,303,882 B1 | * | 10/2001 | Stephens et al. | 177/147 |

FOREIGN PATENT DOCUMENTS

| | | | | |
|---|---|---|---|---|
| EP | 467643 A2 | * | 1/1992 | 177/147 |
| GB | 2248304 | * | 1/1992 | 73/862.635 |

* cited by examiner

Primary Examiner—Randy W. Gibson
(74) Attorney, Agent, or Firm—Hodgson Russ

(57) ABSTRACT

Standard attachment fittings for wire rope and chain (WR&C) that are enhanced to also perform load weighing functions in lifting/support or pulling assembly applications. The existing unmodified shape of each typical WR&C fitting provides focused linear strain under tensile or compression loading at determinable points on the fitting body. Affixing a strain gauge element to any of these points will enable accurate load weight measurement eliminating the need for a separate weigh scale and a "thin section" typically required in load sensors to focus load strain and achieve accurate load weight readings. The invention addresses increased WR&C fitting assembly simplicity, preserved structural integrity, improved assembly compactness, reduced cost, enhanced safety and maintenance of the original application functions of the standard attachment fittings while enhancing the said fittings with weighing function capability.

10 Claims, 6 Drawing Sheets

STANDARD ATTACHMENT FITTINGS FOR WIRE ROPE AND CHAIN ENHANCED TO ALSO PERFORM LOAD WEIGHING FUNCTIONS

CROSS-REFERENCE TO RELATED APPLICATIONS

Application Ser. Nos.
36,184
498,022

STATEMENT REGARDING FEDERALLY SPONSERED RESEARCH OR DEVELOPMENT

Not Applicable

REFERENCE TO A MICROFICHE APPENDIX

Not Applicable

BACKGROUND OF THE INVENTION

The present invention relates in general to standard attachment fittings for wire rope and chain (WR&C) and more particularly, such fittings that are enhanced with weigh sensing capability to also perform load weighing functions.

There are a number of devices (some patented) that provide weighing capability to WR&C load lifting/support or pulling assemblies such as those often found in overhead crane systems. However, with regard to certain aspects of safety complications, weighing device/assembly complexity and component cost, these prior art devices can be subject to specific problems.

A typical prior art weighing device such as that outlined in U.S. Pat's to Khachaturian et al., U.S. Pat. No. 5,429,007 and Khachaturian et al. U.S. Pat. No. 5,589,646 for WR&C lifting/support or pulling applications is a component within the said assembly that is required to lift/support or pull in addition to weighing a load. In order to ensure safety, and functionality consistent with the original tensile and impact loading specifications of the associated WR&C fittings, prior art weighing devices must be tested to meet such load performance specifications.

Such prior art weighing devices are additional lifting component(s) within a lifting/support or pulling assembly that subsequently require additional attachment fitting(s) increasing assembly complexity, cost and the possibility of assembly failure.

Such prior art weighing devices typically require a "thin section" in the body of the load sensor to focus load weight in order to achieve load weight measurement accuracy. This thin section reduces structural integrity of the weighing device.

BRIEF SUMMARY OF THE INVENTION

Standard attachment fittings for wire rope and chain (WR&C) enhanced with weigh sensing capability to also perform load weighing functions. A membrane thin strain gauge element is affixed to the body of a said fitting in any one of a number of possible positions. Accurate load weight measurements are achieved from the focused linear load strain that results in the fitting when a typical tensile or non-typical compressive load (in the case of an eye bolt) is applied. The load weight measurements are transmitted through wiring or a wireless remote system to a suitably positioned readout display.

It is an object of the present invention to enhance standard attachment fittings for WR&C used in lifting/support or pulling applications to perform load weighing functions without modification to their basic design configuration whilst maintaining their original application functionality.

A feature of the present invention is that it provides the said enhancement without introducing a separate weigh scale unit that is required to lift/support the load in addition to providing weighing functionality. Therefore additional testing of the strain gauge to ensure that it meets the established WR&C fitting tensile and shock load performance specifications is not required to ensure safety.

Another feature of the present invention is that it allows a reduction in the number of said WR&C load supporting fitting assembly components thus reducing potential risk of assembly failure, reducing assembly complexity and reducing assembly cost.

Another feature of the present invention is that the need for a "thin section" in the WR&C fitting body to focus load weight in order to achieve load weight measurement accuracy is not required. The unmodified existing shape of the WR&C fitting produces focused linear load strain at specific determinable points on the fitting body permitting accurate load weight measurement. The elimination of the need for a weaker thin section further enhances safety.

Another feature of the present invention is its ability to retain said fitting assembly overload readings for viewing on a readout display to warn the use of potential permanent fitting distortion and further enhance safety.

Another feature of the present invention is that, when shackle fittings are used, the weigh sensing strain gauge element position will not interfere with the attachment and removal of the shackle pin.

Another feature of the present invention is that because of the reduction of WR&C load supporting fitting assembly components, the assembly length can be reduced thereby increasing the available load clearance from the floor in applications such as those involving overhead crane use.

DETAILED DESCRIPTION OF PREFERRED EMBODIMENTS

Figure 1A:
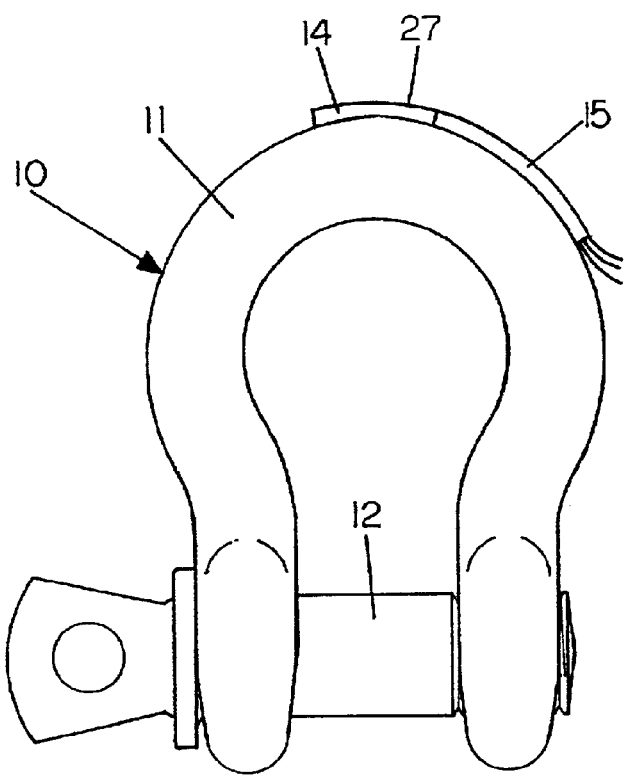
FIG. 1a is a front view of a weigh-sensed shackle fitting according to a preferred embodiment of the present invention.
Figure 1B:
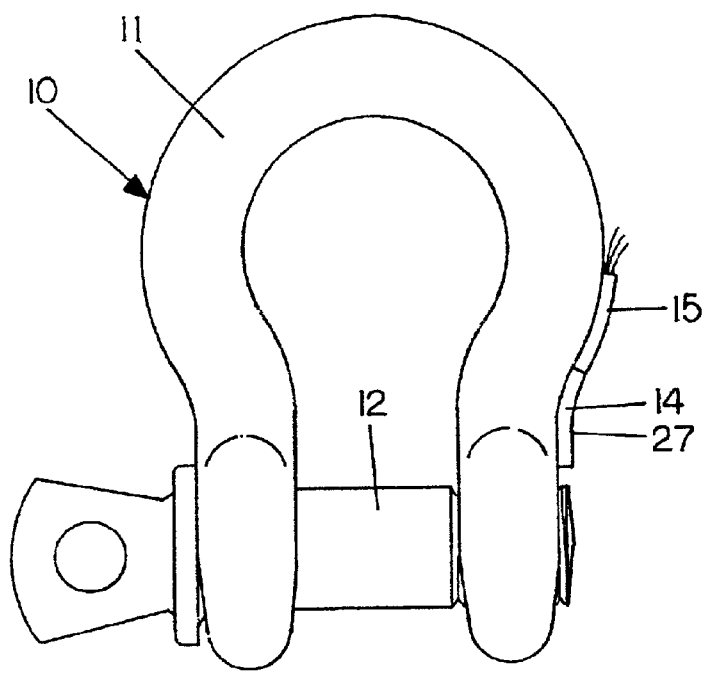
FIG. 1b is a front view of a weigh-sensed shackle fitting according to a second preferred embodiment of the present invention.

FIGS. 1a and 1b illustrate a standard pin and shackle assembly for wire rope and chain (WR&C) lifting/support or pulling applications that is enhanced with weigh sensing capability to also perform load weighing functions according to a first and second preferred embodiment of the present invention. The said weigh-sensed standard pin and shackle assembly 10 is comprised of a shackle pin 12 affixed to a shackle body 11. A membrane thin strain gauge element 14 configured as a Wheatstone bridge is also affixed to the shackle body 11 at a predetermined position tested for the production of focused linear load strain readings when subjected to tensile loading in typical applications. The strain gauge element 14 can be connected by wiring 15 to a suitably positioned commercial electronic readout display unit or else configured to provide load readings to the said display through a wireless remote system. The wiring 15 (when used) and the strain gauge element 14 are protected by a highly resilient impact resistant material 27. The wiring 15 is connected to a stretchable cable and end fittings (not shown) to protect the hook-up from inadvertent disconnection and provide a quick and easy to use interconnect between the strain gauge element 14 and a readout display unit.

Other configurations and application functionality of standard WR&C fittings enhanced with weigh sensing capability are also possible.

Figure 2:
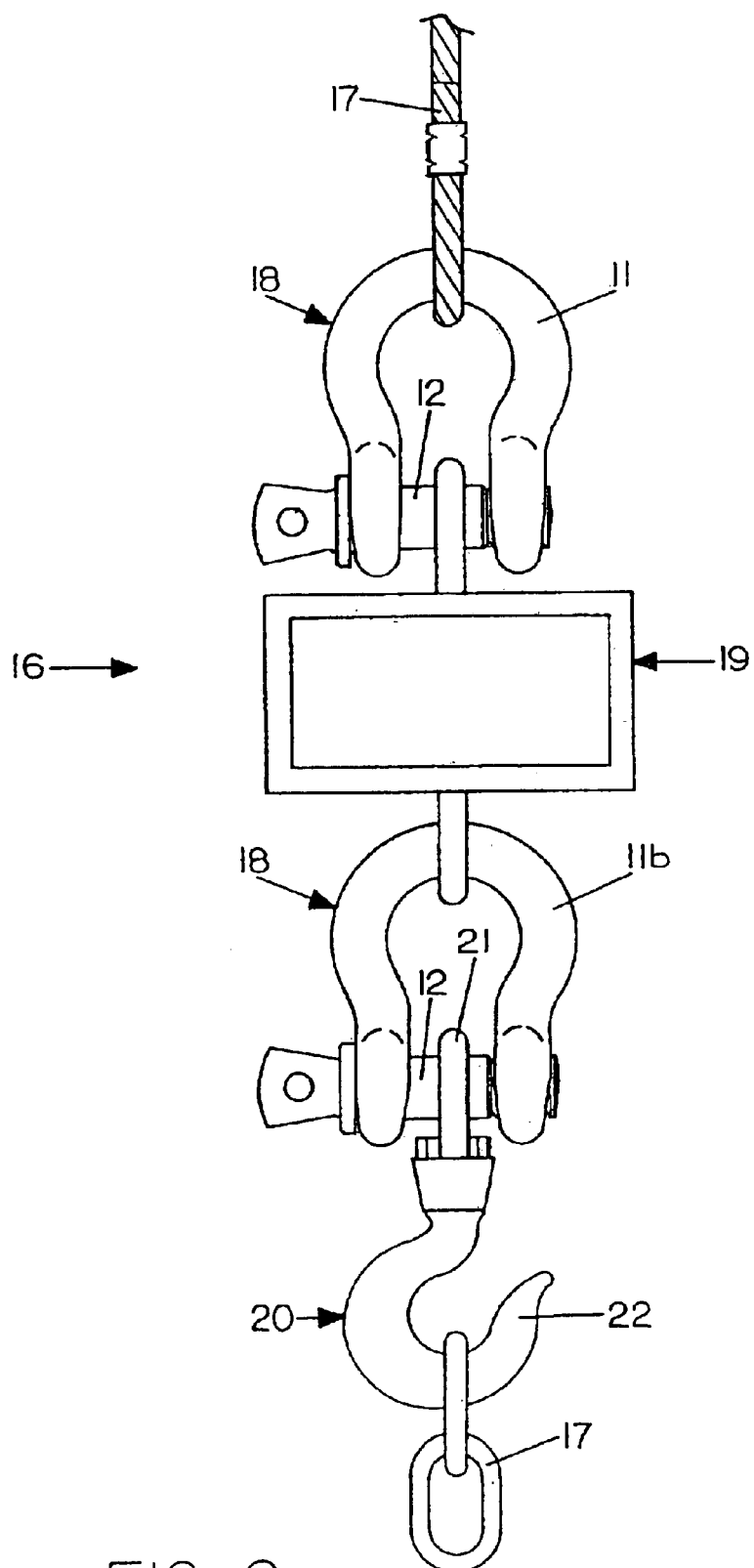
FIG. 2 is a front view of a likely conventional wire rope and chain lifting/support or pulling assembly with weigh scale.

FIG. 2 illustrates a likely conventional WR&C lifting/support assembly utilizing an "in-line" separate weigh scale as a component required to both weigh and lift/support a load. The said assembly 16 is comprised of two standard shackle assemblies 18 (each comprised of a shackle body 11 or 11b and shackle pin 12), a hook assembly 20 (comprised of a hook body 22 and swivel eye 21), weigh scale 19 and wire rope or chain 17.

Figure 3:
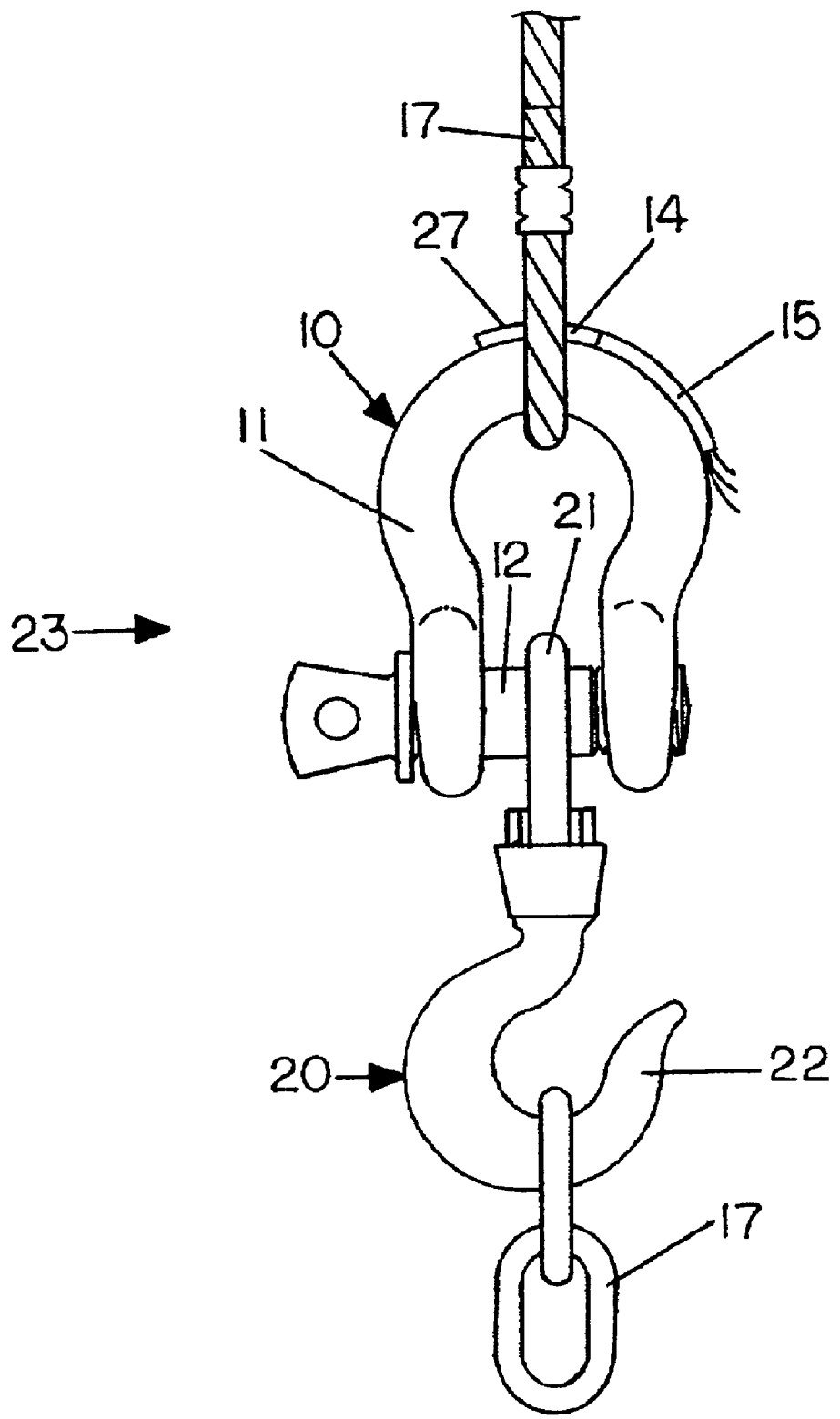
FIG. 3 is a front view of a likely weigh-sensed wire rope and chain lifting/support or pulling assembly according to the present invention.

FIG. 3 illustrates a likely weigh-sensed WR&C lifting/support or pulling assembly according to the present invention wherein the conventional weigh scale is replaced with a membrane thin strain gauge element. The said assembly 23 is comprised of one weigh-sensed standard shackle assembly 10 (comprised of a shackle pin 12 and shackle body 11 with affixed strain gauge element 14 and, in the case of a non-wireless remote system, wiring 15), a hook assembly 20 (comprised of a hook body 22 and swivel eye 21) and wire rope or chain 17. As a component in the said assembly, the strain gauge element 14 only provides weighing functionality and is not required to lift/support the weight of a load.

Figure 4A:
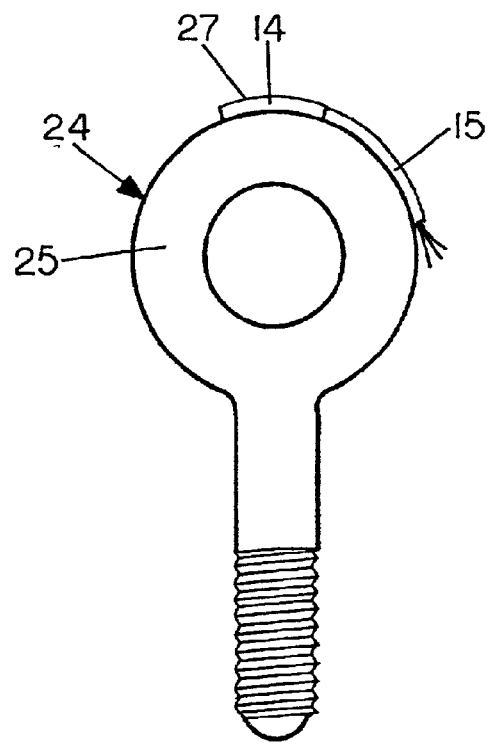
FIG. 4a is a front view of a weigh-sensed eye bolt fitting according to a third preferred embodiment of the present invention.
Figure 4B:
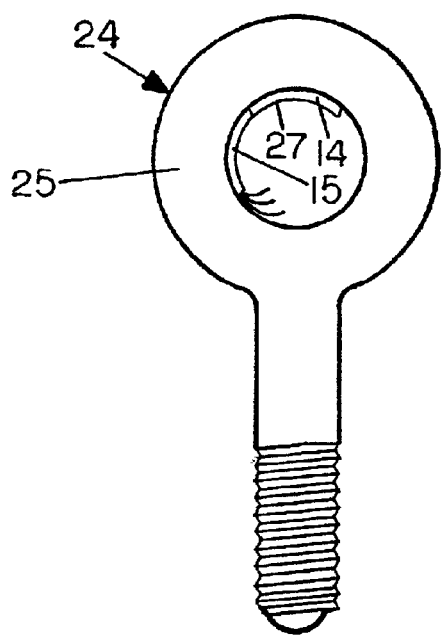
FIG. 4b is a front view of a weigh-sensed eye bolt fitting according to a fourth preferred embodiment of the present invention.
Figure 4C:
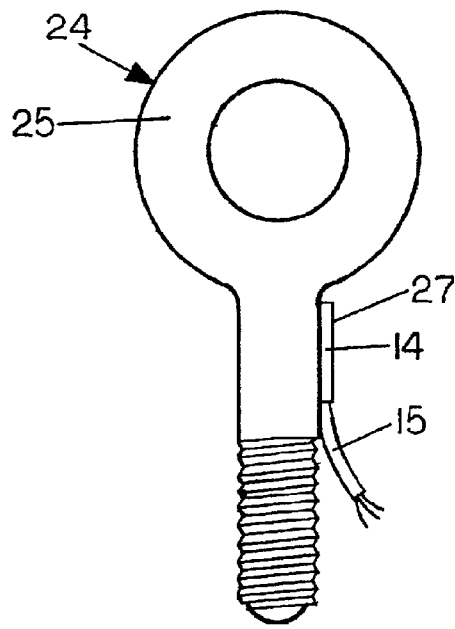
FIG. 4c is a front view of a weigh-sensed eye bolt fitting according to a fifth preferred embodiment of the present invention.

FIGS. 4a, 4b and 4c illustrate a standard eye bolt for WR&C lifting/support or pulling applications that is enhanced with weigh sensing capability to also perform load weighing functions according to a third, fourth and fifth preferred embodiment of the present invention respectively. The said weigh-sensed eye bolt assembly 24 is comprised of an eye bolt body 25 and membrane thin strain gauge element 14. Strain gauge element 14 is configured as a Wheatstone bridge and affixed to eye bolt body 25 at a predetermined position tested for the production of focused linear load strain readings when subjected to tensile or compression loading. The strain gauge element 14 can be connected to and used with a commercial electronic readout display in the same manner outlined for the weigh-sensed pin and shackle assembly.

Figure 5A:
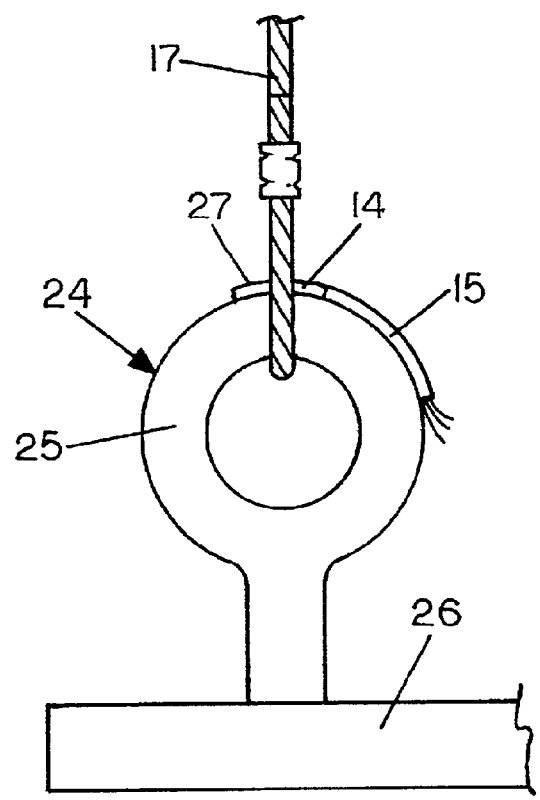
FIG. 5a is a front view of one of a number of weigh-sensed eye bolt and wire rope assemblies under tension and affixed to a platform or vessel according to the present invention.
Figure 5B:
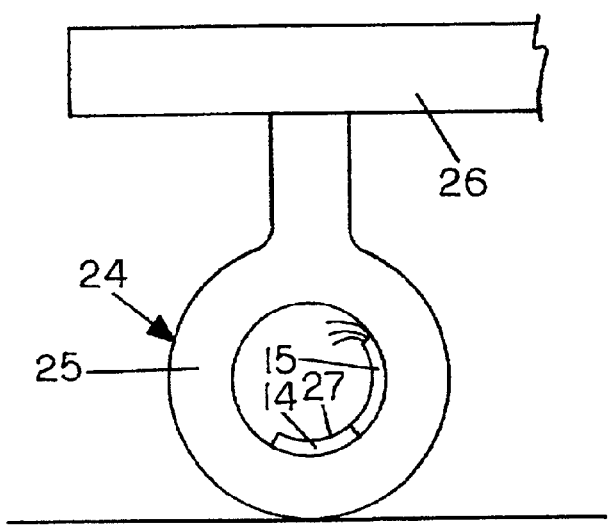
FIG. 5b is a front view of one of a number of weigh-sensed eye bolts under compression and affixed to a platform or vessel according to the present invention.
Figure 6:
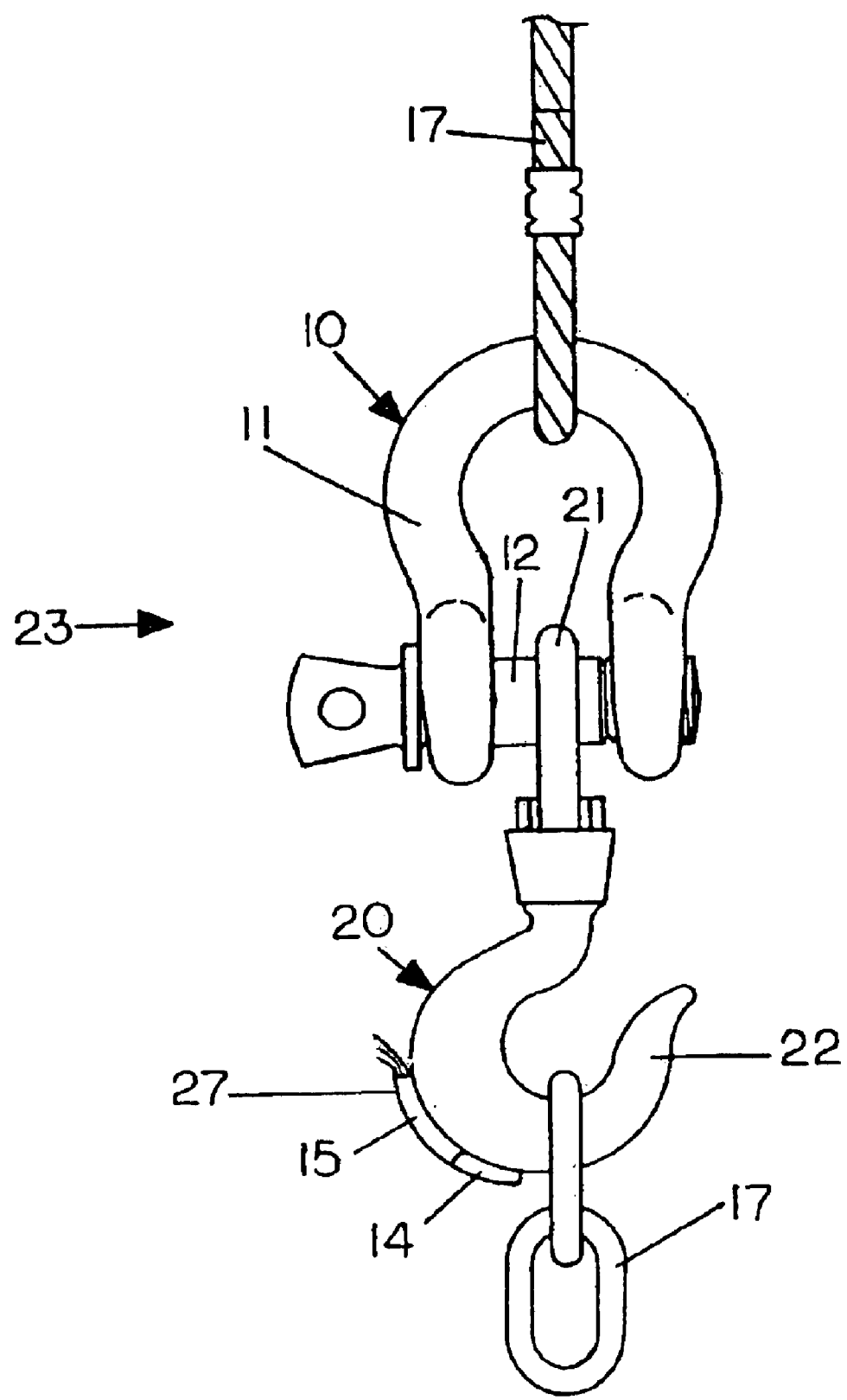
FIG. 6 is a front view of a weigh-sensed hook assembly according to the present invention.

FIGS. 5a and 5b illustrate functional applications of the said weigh-sensed eye bolt assembly 24 subjected to typical tensile and non-typical compression loading respectively. In a tension loading application, an object or other matter could be placed in a vessel or on a platform 26 or the like and lifted with a number of eye bolt assemblies to obtain accurate weight readings. In a compression loading application, an object or other matter could be placed in a vessel or on a platform 26 or the like and supported with a number of weigh-sensed eye bolt assemblies to obtain accurate weight readings. In the case of non-typical compression loading of the weigh-sensed eye bolt 24, focused linear strain still results.

The present invention, illustrated in FIGS. 1a, 1b, 3, 4a, 4b, 4c, 5a, 5b, and 6, is well suited for any WR&C lifting/support or pulling application in which accurate load weighing capability, enhanced safety, reduced cost and increased simplicity using standard WR&C fittings are also required. Although standard shackle and eye bolt fittings have been used in describing the present invention, it will be apparent to those skilled in the area that other WR&C fittings such as hooks and master links are also applicable (see FIG. 6). As a result of their basic standard shapes, such fittings have determinable positions on their surfaces (as shown in FIGS. 1a, 1b, 4a, 4b and 4c) that are subject to focused linear strain when used in the said applications. In the case of shackle fittings, placement of the strain gauge element 14 on the shackle body 11 ensures that the strain gauge 14 does not interfere with the shackle pin 12 during assembly and disassembly of the shackle assembly 10 with the rest of the WR&C fitting assembly 23. Focused linear strain results in accurate load weight measurement making the said WR&C fittings very suitable in configuration for load weighing functions (such as those shown in FIGS. 3, 5a and 5b) in addition to all of the original intended functions of such fittings.

Further to this, the focused linear strain that results from loading the said WR&C fittings eliminates the need to introduce a "thin section" in the fitting body or load sensor to focus load weight within this weakened area in order to achieve load weight measurement accuracy. By eliminating fitting body modifications and the normally required thin section common to load cell construction, the structural integrity and original functionality of the said WR&C fittings is maintained.

The stated utilization of standard WR&C fittings to also encompass the function of measuring load strain eliminates the requirement for a separate weigh scale unit 19 and any subsequent extra weigh scale unit attachment fitting(s) such as 11b to be used within a weigh-sensed WR&C lifting/support or pulling assembly 23. Fewer lifting/support components are required. The issue of required testing and certification of a separate weigh scale 19 (that must lift/support a load in addition to its weighing function) to meet required tensile and shock loading strength specifications is also eliminated.

Further, the present invention also enables overload indication and the monitoring of the condition of standard WR&C fittings as well as the chain and wire rope within the weigh-sensed assembly 23. If excessive load weight is applied to the weigh-sensed assembly 23, a load reading relating to any permanent distortion of the fitting(s), wire rope or chain will not only be shown on a suitably positioned readout display, but will be retained on the readout display after the excessive load has been removed. In this way, the present invention enables a warning to the operator of overload, permanent distortion and possible subsequent failure of the fitting(s), wire, rope or chain. This enhances safety, particularly in critical overhead lifting applications using these types of fitting assemblies.

The standard fitting(s) already required on a typical WR&C lifting/support or pulling assembly also becomes the weigh scale system with the strain gauge 14 properly installed upon the fitting assembly as shown in FIG. 3. Therefore, the cost involved is only for the weigh sensing enhancement of the required fitting(s) rather than a separate weigh scale unit and associated attachment fitting(s).

What is claimed is:

1. A load carrying and measuring device, comprising:
    a shackle body; and
    a strain gauge attached to the shackle body such that the strain gauge measures the strain in the shackle body.

2. The device of claim 1, wherein the shackle body has a first orifice and a second orifice, the orifices being designed to accommodate a shackle pin, and wherein the strain gauge is approximately equidistant from each of the orifices.

3. The device of claim 1, wherein the shackle body has a first orifice and a second orifice, the orifices being designed to accommodate a shackle pin, and wherein the strain gauge is proximate to one of the orifices.

4. The device of claim 1, further comprising an extendable cable, having therein a conductor electrically connected to the strain gauge.

5. A load carrying and measuring device, comprising:
    an eye bolt; and
    a strain gauge attached to the eye bolt such that the strain gauge measures the strain in the eye bolt.

6. The device of claim 5, wherein the eye bolt has a looped end and a post, and the strain gauge is attached to the looped end at a location that is approximately in line with a center line of the post.

7. The device of claim 5, wherein the eye bolt has a looped end and a post, and the strain gauge is attached to the post.

8. The device of claim 5, further comprising an extendable cable, having therein a conductor electrically connected to the strain gauge.

9. A load carrying and measuring device, comprising:
    a hook; and
    a strain gauge attached to the hook such that the strain gauge measures the strain in the hook.

10. The device of claim 9, further comprising an extendable cable, having therein a conductor electrically connected to the strain gauge.

* * * * *